Feb. 20, 1934.   W. C. BUCKNAM ET AL   1,947,755
MULTIPLE FLAME WELDING NOZZLE
Filed April 6, 1929   5 Sheets-Sheet 4
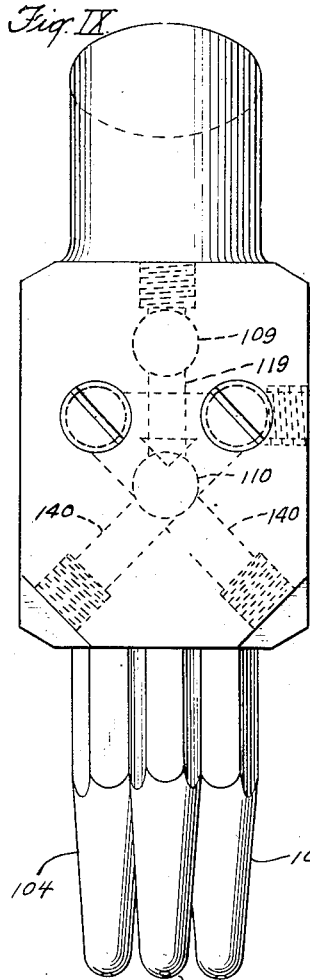
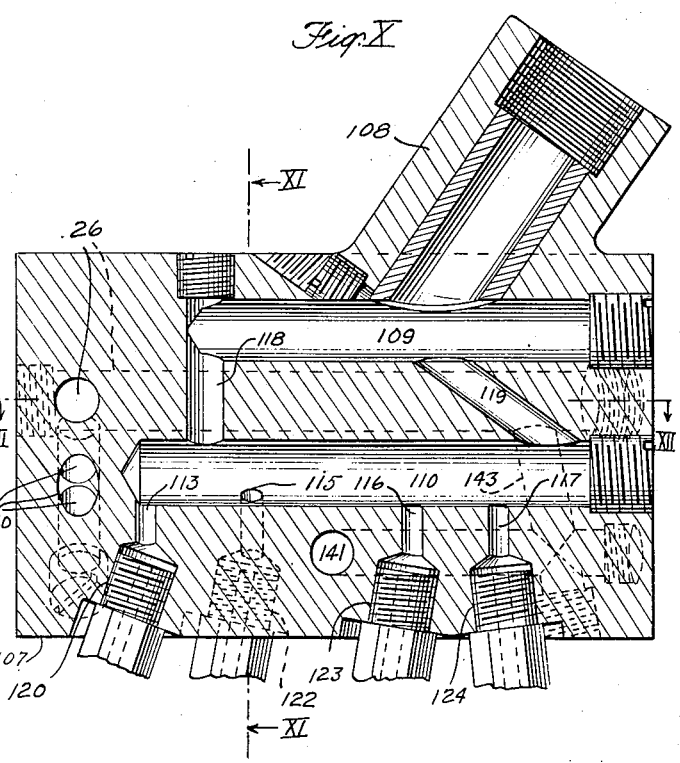
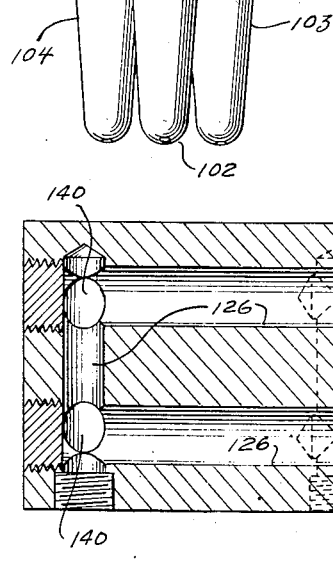
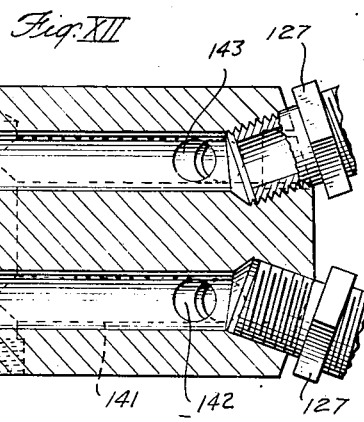
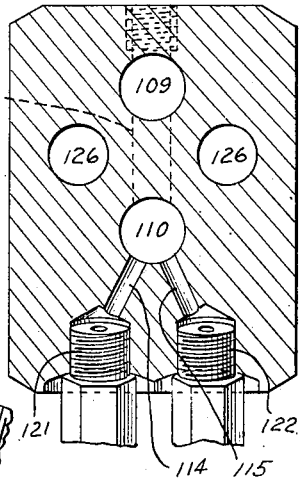
INVENTORS:
Worthy C. Bucknam
George J. Jones
BY Byrnes, Townsend & Brickenstein, ATTORNEYS.

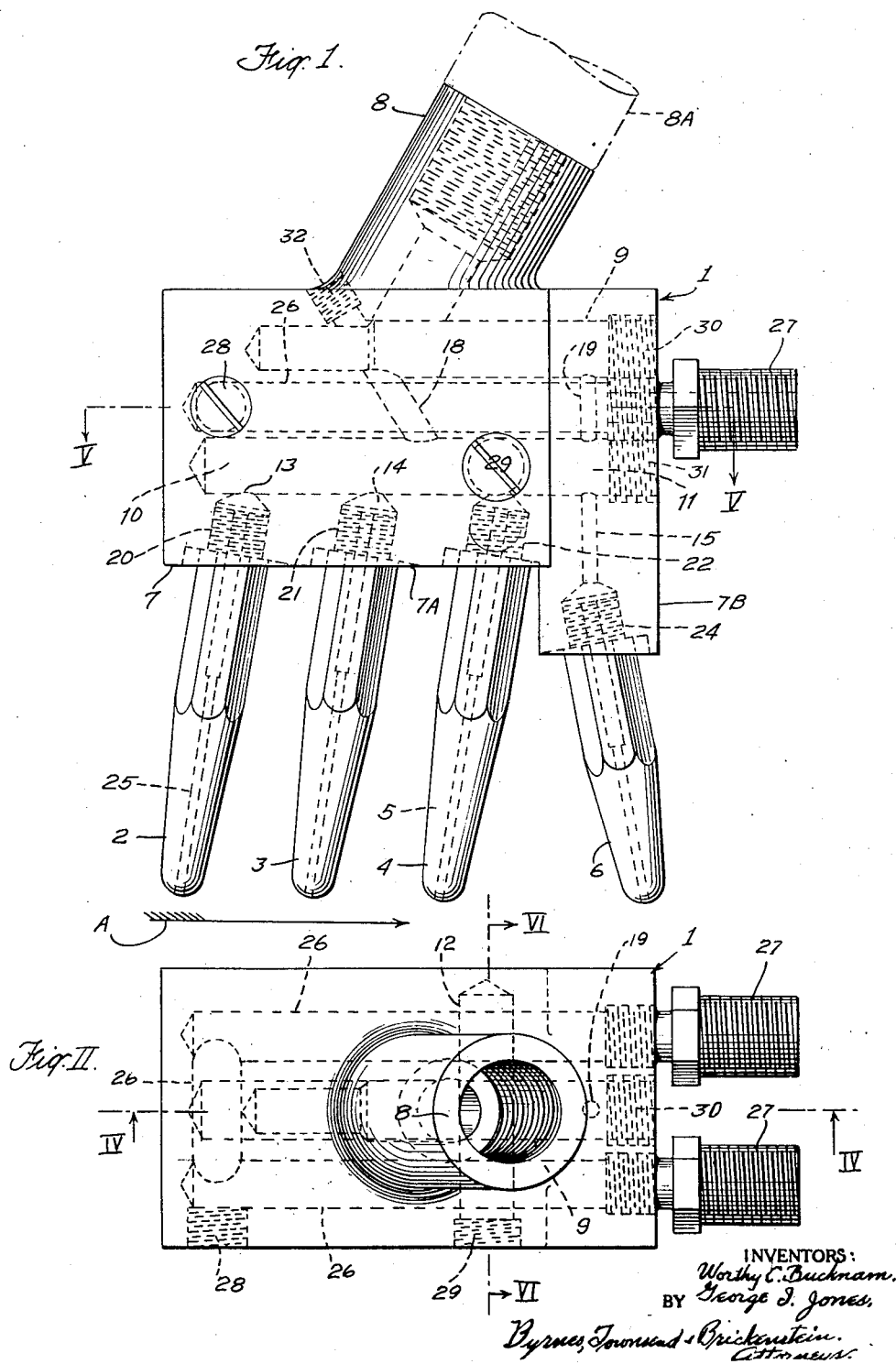

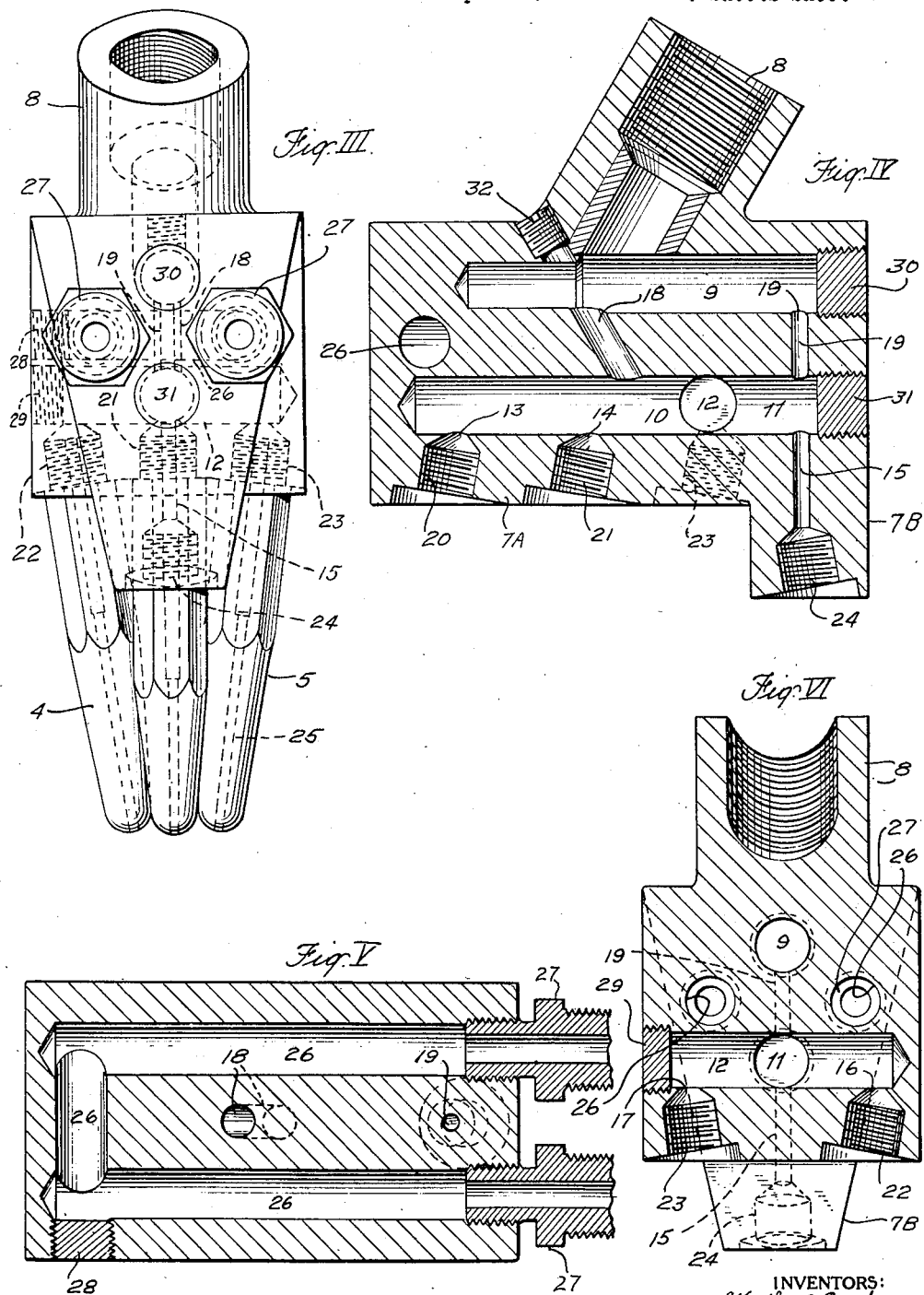

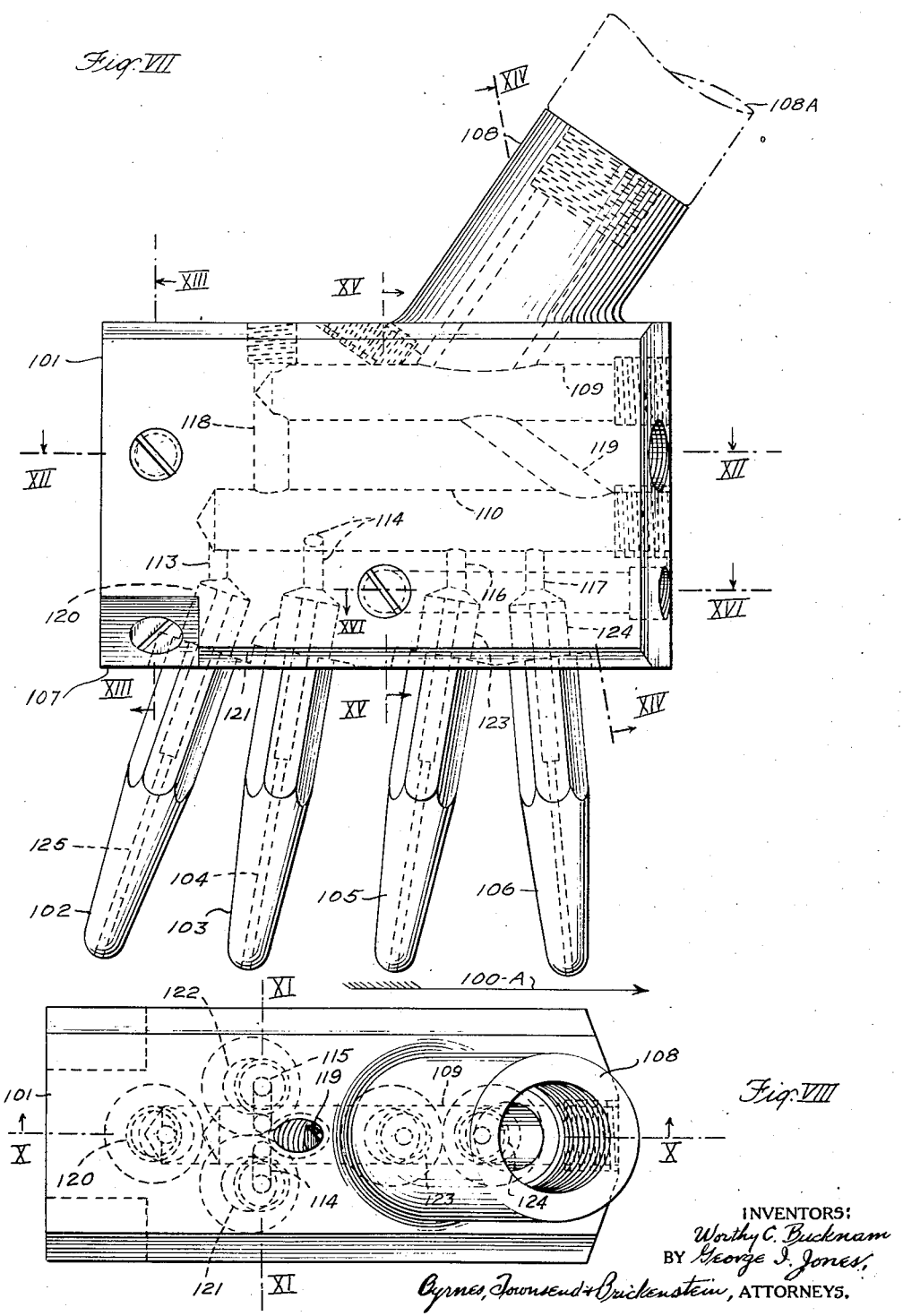

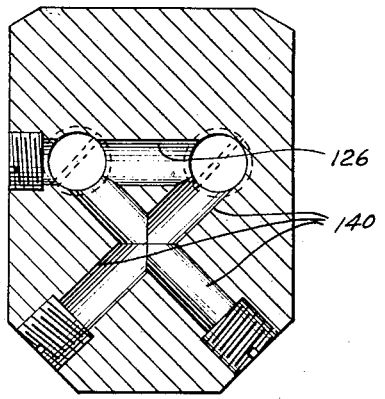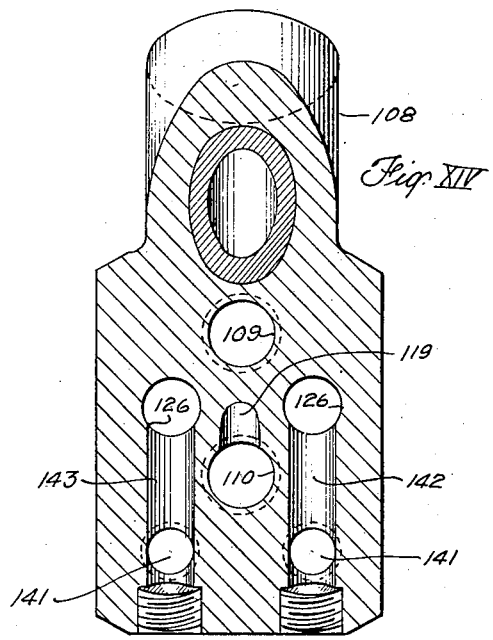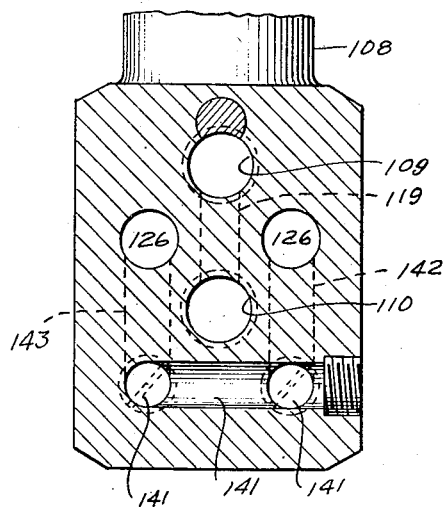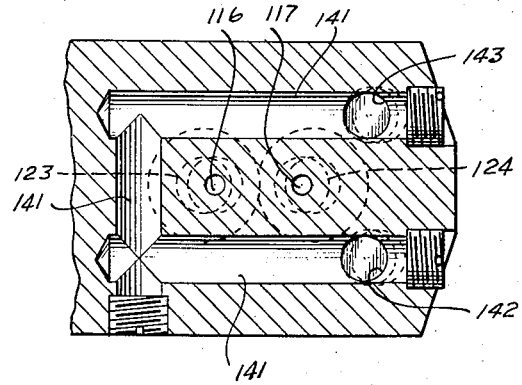

Patented Feb. 20, 1934

1,947,755

UNITED STATES PATENT OFFICE 1,947,755

MULTIPLE FLAME WELDING NOZZLE

Worthy C. Bucknam and George I. Jones, Buffalo, N. Y., assignors to The Linde Air Products Company, a corporation of Ohio Application April 6, 1929. Serial No. 353,129

17 Claims. (Cl. 158—27.4)

Our invention relates to a gas flame welding torch nozzle, and especially to the arrangement of the gas distributing and fluid cooling passages therein, and also to the means for controlling the direction of the projection of the preheating and welding flame.

In welding longitudinal seams in tubes or plates, the edge portions of the metal to be welded are passed in a definite relation to the flames issuing from the nozzle tips of the welding torch. The flames from some of the tips are directed upon the metal edges to preheat them up to or slightly below the point of fusion. Immediately thereafter a flame from another tip is projected upon the preheated metal and fuses the edges of the metal until it flows together and unites.

In the production of a strong homogeneous weld it is important to effectively puddle the fused metal and at the same time not to burn it or blow it out of the seam. This may be accomplished by the proper distribution of the gas to the nozzle tip orifices and the proper construction of the means for controlling the direction of the projection of the flame.

In the operation of the torch it is important that the temperature of the walls of the gas passages be kept below the ignition point of the combustible gas, so as to minimize flash backs, which interfere with efficient operation of the torch.

Therefore, the principal objects of our invention are: to provide an improved means for distributing the gas to the nozzle tips; to provide an improved arrangement of the nozzle tips for controlling the direction of projection of the flame; and to provide improved means for cooling the nozzle to improve its efficiency.

Our invention may be embodied in one or more forms which are shown in the accompanying drawings.

Figs. I, II, and III are respectively a side view, a plan view, and a rear end view of a torch nozzle embodying our invention;

Figs. IV, V and VI are sectional views on line IV—IV in Fig. II; line V—V in Fig. I; and line VI—VI in Fig. II, respectively;

Figs. VII, VIII and IX are, respectively, a side view, a plan view, and a front end view of a modified form of our invention;

Figs. X and XI are sectional views on lines X—X and XI—XI, respectively, in Fig. VIII;

Figs. XII to XVI are sectional views on the corresponding lines XII—XII to XVI—XVI in Fig. VII.

Referring particularly to the modification shown in Figs. I to VI, the torch head or nozzle comprises a nozzle block 1 of brass or the like, having gas conducting and cooling fluid passages formed therein. A set of preheating nozzle tips 2, 3, 4 and 5, and a welding nozzle tip 6, project from the bottom 7 of the nozzle block.

The tips are detachably coupled to the block and have gas passages communicating with the gas distributing passages therein. The preheating tips are attached to the upper step 7—A and the welding tip is attached to the lower and downwardly extending step 7—B formed in the bottom face of the block. The downwardly extending step 7—B makes it possible to place the lower end of the welding tip closer to the adjacent preheating tips for a given rearward angle of inclination of the welding tip included between the welding tip and the bottom face of the nozzle block.

The top of the nozzle block 1 has a screw threaded gas inlet 8, adapted to be connected to a mixing chamber 8—A which supplies a combustible mixture of acetylene and oxygen or a like combustible gaseous mixture to the block. The inlet 8 communicates with a longitudinal receiving chamber 9 formed in the block.

The receiving chamber communicates with a distributing chamber 10 underneath it. The distributing chamber consists of a branch 11, parallel to the receiving chamber and a second branch 12, in communication with the first branch. The axis of the second branch is perpendicular to the axis of the first branch and in the same horizontal plane.

The first branch 11 is provided with outlets 13, and 14, for supplying gas to the two forward preheating tips, and another outlet 15 for supplying gas to the welding tip. The opposite ends of the second branch 12 communicate with outlets 16 and 17, for supplying gas to the preheating tips, 4 and 5 which are arranged at opposite sides of a vertical plane passing through the preheating tips 2, 3 and welding tip 6.

The receiving and distributing chambers are connected by a passage 18, which directs the gas into the distributing chamber against a wall thereof intermediate the outlet 14 and the branch 12. The chambers 9 and 10 are connected by another passage 19, which directs the gas into the distributing chamber at a point directly opposite the outlet 15, for supplying gas to the welding tip. The sum of the areas of passages 18 and 19 is made equal to or slightly greater than the sum of the areas of the gas passages in the nozzle tips in order to maintain a pressure within the chamber 10 sufficient to maintain the desired operating pressure and gas velocity within the nozzle tip passages.

For convenience the direction in which the arrow A in Fig. 1 points will be designated as a rearward direction and the arrow will also designate the relative movement of the work in respect to the torch, the shaft of the arrow being used to designate the surface of the work moving in the direction in which the arrow points. Forwardly inclined threaded sockets 20, 21, 22 and 23 are formed in the bottom of the nozzle block below the respective outlets 13, 14, 16 and 17 to receive threaded rear ends of the preheating nozzle tips. A rearwardly inclined threaded socket 24 is formed below the outlet 15 to receive the welding tip. Each tip has a passage 25 therethrough which communicates with its respective outlet.

In this construction the preheating tips are forwardly inclined. The angle of inclination of these tips to the normal to the face of the block or the surface of the work is preferably about 10°. The two forward tips 2 and 3 are in line in reference to the line of movement of the work relative to the torch nozzle. The two intermediate tips 4 and 5 are located one on each side of the line of the first two tips. The welding tip 6 is inclined in a rearward direction and preferably at an angle of about 10° to the normal to the face of the block or the surface of the work. This tip is in line with the two forward preheating tips.

A means is provided for cooling the torch nozzle to prevent it from becoming over-heated and to prevent a flash back from the gas due to the heat. Referring to Figs. I, II, and V a U shape cooling fluid passage 26, is shown formed in the block 1. The two long branches of the U extend parallel to the gas receiving and distributing chambers and in a plane intermediate these chambers. Each branch of the U is provided with a hose connection 27, one to supply the cooling fluid, and the other to discharge it. The several tips are made of copper or the like and, because of their mechanical connection to the block 1, considerable heat is withdrawn from the tips by the water or other cooling medium that circulates through the block.

The chambers and passages may be formed in the nozzle block in any convenient manner. As shown in the accompanying drawing they are drilled and the open ends of the holes are closed where necessary by plugs 28, 29, 30, 31 and 32.

The form of our torch nozzle shown in Figs. VII to XVI is similar to that just described and the corresponding parts are designated by the same numerals with the addition of 100 and these parts will not be described in detail:

The block 101 has a set of preheating nozzle tips 102, 103, 104 and 105 and a welding nozzle tip 106 projecting from the bottom face 107 of the block which lies in one plane. The nozzle tips are coupled to the block and a mixture of gas is supplied thereto from the mixing chamber 108—A. The mixing chamber is connected to an inlet 108 which is connected to a receiving chamber 109. The latter chamber communicates with a distributing chamber 110, which has outlets 113—117 leading to the nozzle tips.

The receiving and distributing chambers are connected by a passage 118 which directs a stream of gas into the distributing chamber against the wall thereof in rear of the outlet 113. These chambers are also connected by another passage 119 which directs a stream of gas against the rear end wall of the distributing chamber.

The arrow 100—A designates a rearward direction, the direction of the relative movement of the work to the torch nozzle. The shaft of the arrow designates the surface of the work.

Forwardly inclined sockets 120, 121, 122, and 123 for receiving the preheating nozzle tip shanks are formed in the bottom face of the nozzle block. A rearwardly inclined socket 124 for receiving the welding tip is also formed in the block in rear of the preheating tips. Each of the tips has a passage 125 therethrough which communicates with one of the outlets of the distributing chamber.

In this form of the torch nozzle the foremost and rearmost preheating tips and the welding tip are in line. The intermediate preheating tips 103 and 104 are positioned one on each side of the line of the other tips. The preheating tips are forwardly inclined and the degree of inclination of the tips to the normal to the face of the block or surface of the work decreases from the front to the rear. The preferred inclination of the foremost preheating tip is about 20°, that of the intermediate set is about 10°, and that of the rearmost one is about 5°. The welding tip is rearwardly inclined and preferably at an angle of about 10° to the normal.

In this form of our device a very effective means of cooling the walls of the gas passages is provided. A main U-shaped passage 126 is formed in the block having its long branches extending nearly the entire length of the block on opposite sides of the gas passages 118 and 119. One of the nipples 127 serves as an inlet for a cooling fluid while the other serves as an outlet. The front end of the block has two intersecting pasages 140 formed therein, which extend in a vertical plane from the forward end of the long branches of the main passage 126 to the bottom of the block. Below the passage 126 there is another but shorter U-shaped passage 141 formed in the rear end of the block. The long branches of this passage extend lengthwise of the block on each side of the welding tip socket 124 and rearmost preheating tip socket 123; and the cross passage connecting these branches passes between the intermediate preheating tip sockets 121, 122 and the rear preheating tip socket 123. The long branches of the two U-shaped cooling fluid passages are connected at their rear ends by passages 142 and 143. The lower U-shaped passage provides a positive circulation of coling fluid in the bottom rear portion of the block which tends to become more intensely heated than the front end.

In the operation of the torch nozzle shown in Figs. I to VI, a mixture of combustible gas is supplied from the mixing chamber 8—A to the inlet 8, which delivers it to the receiving chamber. The gas splits into two streams in the receiving chamber. One of the streams passes through the passage 18, and impinges against the bottom wall of the distributing chamber. The other stream passes through the passage 19 and is directed towards the outlet leading to the welding tip. In the distributing chamber the gas is broken up into as many streams as there are tips, a stream going to each tip.

Although our improved torch nozzles are especially useful on automatic welding machines which weld the longitudinal seams of tubular articles such as barrels, tanks and the like, they are also well adapted for use in weld uniting plates and similar work. It is generally preferable to mount the torch nozzle in a fixed position on the welding machine and feed the work so that the joint to be welded travels lengthwise under the nozzle along the main longitudinal plane of the preheating and welding flames. In some instances, however, the torch and improved nozzle may be propelled along the seam of stationary work to weld such seam. For convenience in explaining the operation of our improved nozzles, it will be assumed that the latter are stationary and the work seam is fed in the direction and along the line indicated by the arrow A in Fig. 1.

The streams of gas issuing from the tips when ignited project flames upon the metal passing the ends of the tips. The seam to be welded is aligned with the bores 25 in the aligned tips 2, 3 and 6, and these tips direct a flame onto the seam, while the other two tips 4 and 5 direct a flame onto the metal surfaces adjacent each side of the seam. Considering one point on the seam of the metal as it advances under the tips, the flames from the preheating tips are successively directed upon this point in an inclined forward direction and the temperature of the metal is gradually increased thereby until the temperature has been brought substantially up to the fusion point of the metal when the point on the metal has passed the rearmost of the preheating tips. The flame from the welding tip is next directed upon this point in an inclined rearward direction. The metal is heated to or beyond the temperature of fusion, and the edges of the metal are fused together.

The force of the rearwardly inclined welding flame pushes the fused metal to the rear of the welding tip where it may begin to cool instead of being pushed ahead of the tip and closer to the heating zone of the preheating tips and thus increase the tendency to burn the metal and blow it from the seam as is done in prior types of torch nozzles. The rearwardly impinging flame produces an improved puddling of the fused metal and an improved weld is obtained.

A positive circulation of a cooling fluid in the passage 26 adjacent to the gas passages, keeps the torch nozzle cool, prevents flash backs, and generally increases the efficiency of the nozzle.

The operation of the modification of our torch nozzle shown in Figs. VII to XVI will be readily understood from the foregoing.

While we have disclosed the preferred form of our device, we do not wish to be limited to the specific form shown as the details thereof may be varied without departing from the scope of our invention. For example, the number and the degree of angularity of the nozzle tips may be varied without a departure from the invention as set forth in the statement of the invention and in the claims appended hereto.

We claim:

1. A welding torch nozzle comprising a body having a gas receiving chamber, an inlet for delivering gas to said chamber, a gas distributing chamber communicating with said receiving chamber, a plurality of gas outlets leading from said distributing chamber, and a passage for circulating a cooling medium through said block.

2. A welding torch nozzle comprising a body and nozzle tips extending therefrom, said body having a gas receiving chamber adapted to be connected to a supply of gas, a gas distributing chamber having spaced outlets for the flame tips, and a passage extending from the receiving chamber into the distributing chamber for directing a stream of gas against the wall portions of the chamber not pierced by the outlets.

3. A welding torch nozzle comprising a body and preheating and welding tips, said body having a longitudinally extending receiving chamber adapted to be connected to a supply of gas, a longitudinally extending distributing chamber, the second chamber having spaced outlets for said preheating tips and also an outlet for said welding tip, a passage connecting said chambers and entering said distributing chamber at a point intermediate said first outlets, and a second passage connecting said chambers and entering the distributing chamber at a point opposite the outlet to the welding tip.

4. A welding torch nozzle comprising a body, a plurality of nozzle tips connected thereto, said body having a gas receiving chamber adapted to be connected to a gas supply, a gas distributing chamber having outlets to the nozzle tips, a plurality of gas passages connecting the chambers, and a cooling fluid passage on the opposite sides of the gas passages.

5. A welding torch nozzle comprising a body, a plurality of nozzle tips provided with gas discharge orifices connected to said body, said body having a gas receiving chamber adapted to be connected to a supply of gas, a gas distributing chamber having outlets to the nozzle tip orifices, gas passages connecting said chambers, the sum of the areas of said passages being substantially equal to the sum of the areas of said orifices, and a cooling fluid passage extending on opposite sides of said connecting passages.

6. In a welding torch nozzle, means for directing a heating flame upon a seam between pieces of metal to be welded, said heating flame and said metal being adapted to move relatively with respect to each other so that said flame traverses said seam in a lengthwise direction, and means for directing another heating flame upon said seam in rear of said first flame and at an inclination to the surface of the metal and in the direction of the movement of said metal with respect to both of said flames.

7. In a welding torch nozzle having preheating and welding tips, the preheating tips being arranged to discharge a flame upon the work, the welding tip being arranged to discharge a flame at an acute angle to the surface of the work and being inclined in the direction of the relative motion of the work with respect to the nozzle.

8. In a welding torch nozzle, means for projecting a plurality of jets of preheating flames upon the work at an acute angle to the surface of the work and in the direction opposite to the relative movement of the work with respect to the nozzle, and means for projecting a welding flame upon the work at an acute angle to the surface of the work and inclined in the opposite direction to the preheating flames.

9. In a welding torch nozzle, means for directing a preheating flame upon pieces of metal to be welded, and means for directing a welding flame upon the preheated metal at an acute angle to the surface of the metal and inclined in the direction of the relative movement of the metal with respect to the nozzle.

10. A welding torch nozzle having preheating discharge orifices and a welding discharge orifice intersected by a common plane which is pierced by the axes of said orifices, said nozzle having passages therein for conducting a combustible mixture of gas to said preheating orifices and a passage leading to said welding orifice, the discharge end portion of said latter passage being rearwardly inclined to said plane.

11. A welding torch nozzle having preheating discharge orifices and a welding discharge orifice intersected by a common plane which is pierced by the axes of said orifices, said nozzle having passages therein for conducting a combustible mixture of gas to said preheating orifices, said passages terminating at said orifices in a portion forwardly inclined to said plane, and said nozzle having a passage therein for conducting a combustible mixture of gas to said welding orifice, the discharge end portion of said latter passage being rearwardly inclined to said plane.

12. A welding torch nozzle for welding longitudinal seams having a longitudinal movement relative with respect to the nozzle, said nozzle having a block containing gas distributing passages, a front row of forwardly inclined preheating tips for projecting a flame directly into the seam, a forwardly inclined set of preheating tips immediately to the rear of the first row, the tips of said set being off-set to each side of the seam, and a rearwardly inclined welding tip in rear of the last set of tips and in line with the first row, all of said tips being secured to said block and supplied with gas from said passages.

13. A torch nozzle comprising a nozzle block having steps formed in its bottom surface, a set of forwardly projecting preheating nozzle tips attached to the upper step and a rearwardly projecting welding tip attached to the lower step in the rear of the preheating tips.

14. In a torch nozzle, a nozzle block having a gas distributing chamber, a main cooling fluid passage adjacent to and above the distributing chamber and extending from the front wall to the rear wall of the block, said passage having an inlet and an outlet and a branch passage in the front end of the block, in communication with the main cooling fluid passage, and extending from said main passage to the bottom wall of the block.

15. In a torch nozzle, a nozzle block having a gas distributing chamber, said chamber having outlets extending through the wall of the block, a cooling fluid passage located above and below said distributing chamber for circulating a cooling fluid adjacent to said chamber and said outlets.

16. In a torch nozzle, a nozzle block having a gas distributing chamber, said chamber having outlets extending through the bottom wall of the block, a main cooling fluid passage located above the distributing chamber, said main cooling fluid passage having an inlet and an outlet, a second continuous cooling fluid passage located below the distributing chamber and having a branch extending on opposite sides of the gas outlets, one of said branches being connected to the outlet to the main cooling fluid passage and the other branch being connected to the inlet to the main passage.

17. In a torch nozzle, a nozzle block having a gas receiving and a gas distributing chamber and outlets from the distributing chamber, a plurality of passages connecting said chambers, a main cooling fluid passage having connected branches on opposite sides of the connecting gas passages, one of said branches having an inlet and the other an outlet, a second cooling fluid passage located below said distributing chamber and having connected branches on opposite sides of the distributing chamber outlets, one of said branches being connected to the main cooling passage outlet and the other branch to the main cooling passage inlet.

WORTHY C. BUCKNAM.
GEORGE I. JONES.